United States Patent
Wemyss et al.

[11] 3,815,415
[45] June 11, 1974

[54] ROTARY FLOWMETER

[76] Inventors: William Alexander Wemyss; Anthony Charles Wemyss, both of West House, London Rd., Great Missenden, England

[22] Filed: Nov. 28, 1972

[21] Appl. No.: 310,183

[30] Foreign Application Priority Data
Nov. 30, 1971  Great Britain.................... 55578/71

[52] U.S. Cl............................................. 73/231 R
[51] Int. Cl. ............................................. G01f 1/00
[58] Field of Search........... 73/229, 230, 231 R, 197

[56] References Cited
UNITED STATES PATENTS
| | | | |
|---|---|---|---|
| 979,518 | 12/1910 | Larrabee................................ | 73/229 |
| 3,370,465 | 2/1968 | Belle ...................................... | 73/230 |
| 3,709,037 | 1/1973 | Abbotts................................. | 73/231 R |

FOREIGN PATENTS OR APPLICATIONS
| | | | |
|---|---|---|---|
| 981,171 | 1/1965 | Great Britain ..................... | 73/231 R |
| 655,154 | 12/1928 | France................................ | 73/231 R |

*Primary Examiner*—Richard C. Queisser
*Assistant Examiner*—John P. Beauchamp
*Attorney, Agent, or Firm*—Allison C. Collard

[57] ABSTRACT

A fluid flowmeter having a housing with inlet and outlet ducts for carrying the entire fluid to be measured, and two stator passages formed within the housing and extending oppositely from the inlet duct, a seat in coaxial alignment with each stator passage and two further passages each leading from a respective stator passage to communicate with the outlet duct. A rotor is disposed in the stator passages to be driven by the fluid flow and the rotor includes two bearing heads mounted at each end of the motor for cooperation with their respective seats. The heads also include a fluid turbine mounted adjacent to each head and a spindle connecting the turbines and the heads. The turbines are pitched so as to rotate the spindle in the same direction. A clearance is provided between the heads and the seats so that either both the heads are unseated or one of the heads is seated while the other remains unseated during the operation. The bearing head may be replaced by a disc or the disc can be eliminated so that the end of the spindle includes only a turbine, so that fluids of different viscosity can be measured.

12 Claims, 6 Drawing Figures

ROTARY FLOWMETER

This invention relates to flowmeters of the general kind in which turbine like rotor means housed within ducting is driven by the flow of fluid through the ducting the general direction of such flow being axial in respect of the rotor means, and the revolutions of the rotor being counted to signal the amount of fluid passed. The present invention is concerned to provide a flowmeter of this general character which will afford high accuracy of reading over a wide flow range, which may permit considerable variations of attitude and which always affords passage for reversal of flow. The device belongs to the category of flowmeters which, having turbine-like rotor means, is further provided with means sensitive to the fluid flow to cause a slight axial shift of the rotor in such manner as to eliminate mechanical friction.

A first aspect of the invention accordingly provides a fluid flowmeter having a rotor with a spindle extending between two end structures which include fluid-driven turbines oppositely handed and freely rotatable within a pair of coaxially stator passages, the said passages leading in opposite senses of direction from a common inlet duct and being led by further passages into a common outlet duct, the ducts carrying the whole fluid throughput to be metered, the flow meter including a sensor of rotor rotation.

It has been found that by providing each turbine with a generally frusto-conical section, leading from the turbine blade roots towards its apex conicident with the spindle and upstream of the turbine, the rotor is supported in a near frictionless manner within the stator passages by the fluid flowing therethrough when a minimum flow is exceeded this being the minimum measurable flow. As the flow increases, the rotor moves towards a position in which the turbines would be equidistant from the region where the inlet duct leads into the stator passages, and is maintained co-axial with the stator passages by the action of the fluid flowing through each annular space defined by a frusto-conical section, a turbine and the stator passage walls. Each such stator passage may have a parallel bore or, in some cases a slightly tapered bore in order to enhance the self-centering action of the rotor.

According to a second aspect of the invention a flowmeter has two oppositely-handed turbines on an axially movable rotor unit shaft, and at least two bearing heads on the same shaft which heads have complementary seats facing in opposite senses of direction and which are adapted to be urged off such seats by the fluid flow which passes through the turbines, each turbine and respective head being within one of two ducts which are coaxial bifurcations from the source of fluid and which rejoin downstream of the turbines and heads. In such arrangement one at least of the heads is always off its seat (so that, as an incidental potential advantage the system is always open for reversed flow) and moreover the device operates independently of variations of the open area between the bearing heads and their seat which area is available for fluid passage. The interfaces of the bearing heads and seats may be simply frusto-conical surfaces, or the heads may be discs co-operating with frusto-conical seats. In the limit position, or "rest" position of the rotor when a first head is one its seat, the clearance of the other (open) second head is so large that when the rotor unit shifts axially to open the first and when both are equally open, little restriction to flow is caused by the openings.

According further to this invention the ducting which contains the rotor part of the flow-meter is branched so that the fluid coming from upsteam is divided into two channels and these channels turn the direction of flow through a right angle into two coaxially arranged turbine chambers and thence the channels emerge into outlet ducting which conjoins to the final common outlet; whilst there are provided in the two turbine chambers two turbine rotors which are mounted on a common shaft and which, in terms of the direction of flow are contra-rotating, that is to say one is pitched right handed and one left handed, and the shaft has rigid with it two bearing heads which are preferably shaped like mushroom valves each coacting with a frustoconical seat formed in the body of the ducting, the arrangement being that such one bearing head is always off its seat. The turbine spindle preferably passes with clearance through a bore in that part of the duct body which separates the two channels. Whilst for very low rates of flow one of the bearing heads will be on its seat and therefore have mechanical friction, the other will be open to its maximum and will pass such low flow in either sense of direction. When, however, a certain rate of flow is reached the hitherto seated bearing head is lifted from its seat and the whole rotor unit is free from mechanical friction and is rotated by the flow of fluid through the turbines. The dynamic and static pressures acting on the bearing head are substantially balanced and at any rate of flow above the operative minimum above indicated the number of revolutions of the unit is a measure of the quantity of fluid passed. It will be noted that in the very low fluid range in which metering does not take place there must be some pressure drop past the unseated bearing head and therefore through the corresponding turbine and this pressure drop is exerted on the downstream side of the other (seated) head. Consequently when a certain minimum level of flow is exceeded the hitherto seated head is lifted off its seat and this is the point at which the rotor unit is freed from friction. The rotor unit in any convenient manner has a magnetic element which is mounted in such a manner as to sweep a magnetic sensor in the course of rotation thus causing pulses in an electric circuit which pulses are counted by any convenient known means.

A flowmeter according to any aspect of the invention may be provided with a housing which defines the common inlet duct, common outlet duct and stator passages, the shape of the housing being such that the inlet and outlet ducts are co-axial and at 90° to the axis of the co-axial stator passages, means are provided, which include a flow-divider situated within the stator passages where the inlet duct opens thereinto, whereby the fluid flow from the inlet duct is divided and thereafter guided through the stator passages into the outlet duct wherein the divided flows re-combine.

The flow-divider may be provided with a hole extending therethrough, through which hole the rotor spindle may freely pass.

It has been found convenient to adapt flowmeters according to the invention so that the active components, i.e. the bearing heads, seats, turbines and other components in the rotor structure, may be changed so that the performance characteristics of the flowmeter may be altered to suit a particular application. Furthermore, the adaptable flowmeter may be readily converted to any mode of the invention.

An example of the invention will now be described with reference to the following accompanying drawings.

Figure 1:
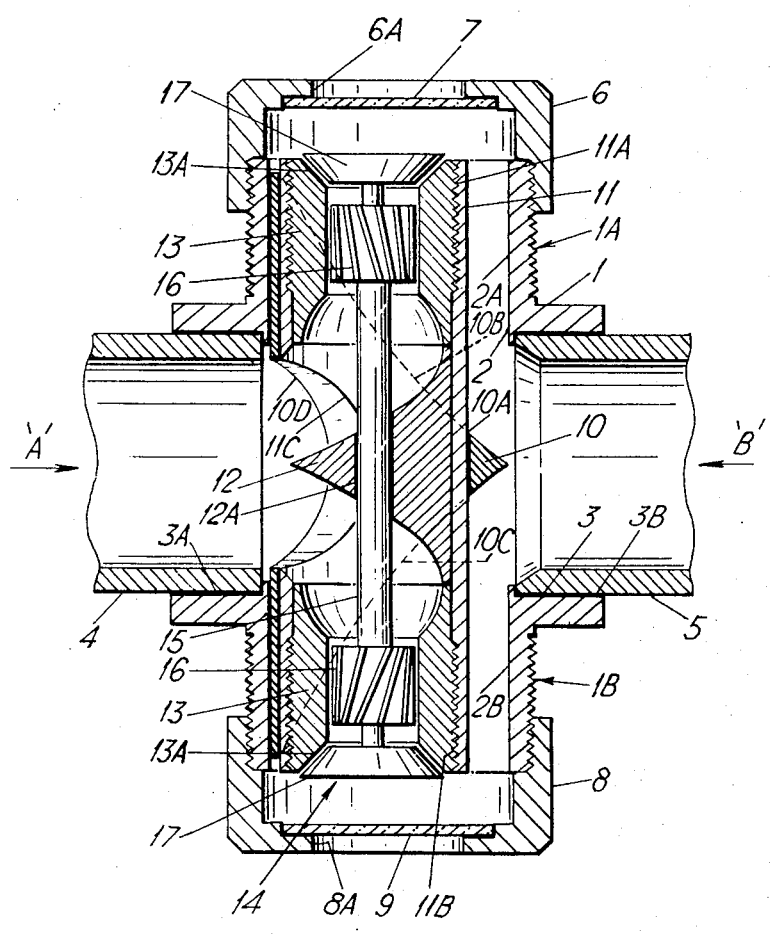
FIG. 1 shows a flowmeter in sectional elevation.
Figure 3:
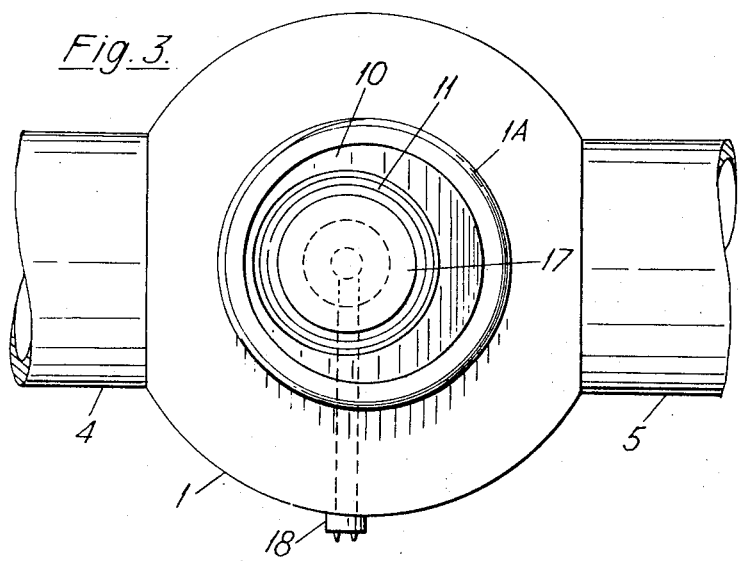
FIG. 3 is a plan view of the flowmeter.
Figure 2:
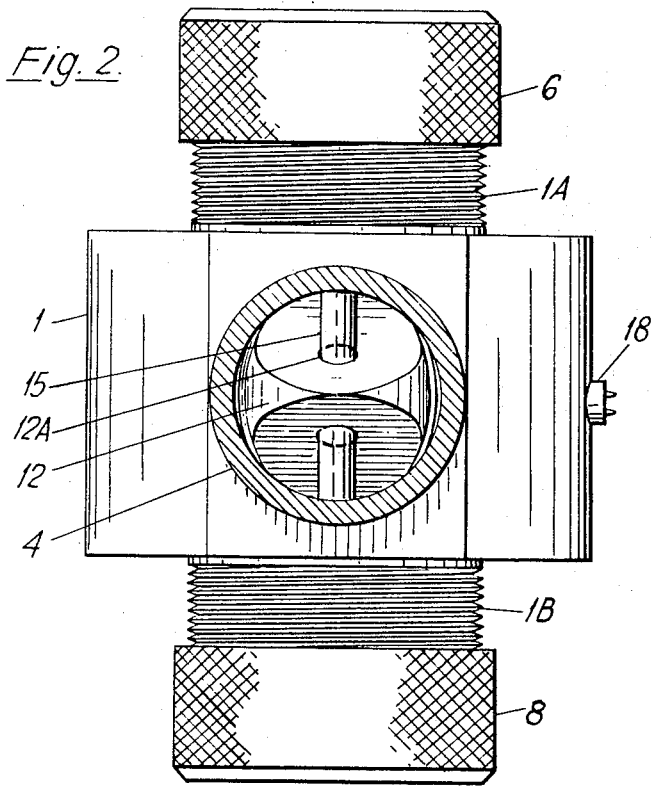
FIG. 2 is a view on the inlet of the flowmeter in the direction of arrow A.
Figure 4:
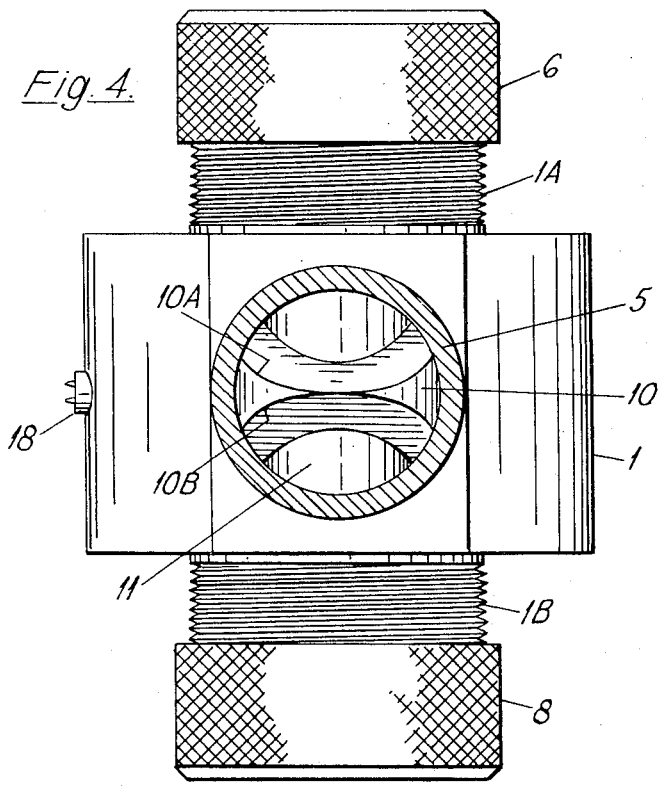
FIG. 4 is a view on the outlet of the flowmeter in the direction of arrow B.

Referring to FIGS. 1 to 4, a fluid flowmeter comprises a body 1 having two bores 2 and 3, at 90° to one another, sections 3A and 3B of bore 3 bearing an inlet duct 4 and outlet duct 5 respectively. The ends 2A and 2B of bore 2 are closed by respective caps 6 and 8 which are internally threaded and co-operate sealedly with threaded portions 1A and 1B respectively of body 1. Cap 6 is provided with an aperture 6A which is fluidly closed by a glass window 7, likewise cap 8 is provided with aperture 8A and window 9.

Fluid guide means 10, of cylindrical cross-section, and having such diameter as to be a tight fit in bore 2, is cutaway as indicated by lines 10B and 10C to provide fluid flow passages leading smoothly from such bore-section 2A and 2B into outlet duct 5.

An eccentric hole 10A extends through guide means 10 and carries a tube 11 internally threaded at each end, the tube-ends 11A and 11B respectively being spaced from windows 7 and 8 so that fluid may pass freely from the tube and into bore-sections 2A and 2B.

Guide means 10 and tube 11 assembled therein are both provided with a port 10D and 11C respectively, which ports are both aligned, fluidly communicating with inlet duct 4. A flow-dividing element 12 is situated within tube 11 in the region of port 11C, and which is so shaped as to divide the inlet flow into two streams one of which is smoothly guided into tube-end 11A and the other into tube-end 11B, the two streams flowing outward towards the caps 6 and 8 respectively. A hole 12A extending through the flow-dividing element 12, co-axial with tube 11, permits a rotor spindle 15 to rotatably extend from one tube-end to the other.

A stator passage 13 and integral frusto-conical seat 13A is screwed into each tube-end 11A and 11B, and assembled within and able to rotate in each such stator passage 13 is a turbine 16 and bearing head 17, both being fastened to an end of a common spindle 15. The turbines 16 are opposite handed so that both are driven to rotate the spindle 15 in the same direction, and bearing heads 17 are so spaced from one another that when one such head 17 is in contact with its associated seat the other is unseated, thus at all times, reverse flow is possible through the flowmeter since both heads 17 cannot be simultaneously seated.

In operation, when a certain minimum inlet flow of fluid is exceeded, whichever head 17 has until then been seated is lifted by the fluid, the rotor, which comprises spindle 15 turbine 16 and heads 17, adopting a position tending towards that in which both heads 17 are equally spaced from their respective seats 13A. A rotor, having neutral buoyancy, or slight negative buoyancy or even a measure of positive buoyancy if so desired, may be provided which would reduce the minimum measurable flow, i.e. that which just supports the rotor without mechanical contact between it and any static parts, to a negligible amount.

When the rotor is fluid supported, friction due to mechanical contact does not exist, and it is free to rotate, being driven by the fluid passing over or through turbines 16.

Fluid leaving each stator passage 13, via the annular space between each head 17 and associated seat 13A, passes into the respective bore sections 2A and 2B to flow therethrough and inwards towards outlet duct 5, being smoothly guided thereinto by guide means 10. Windows 7 and 9 permit viewing of the bearing heads 17 which may have a mark thereon so that rotation of the rotor is clearly visible. If desired, the caps 6 and 8, and associated windows 7 and 9, may be domed or otherwise shaped in order to reduce turbulence in those regions.

Figures 5, 6:
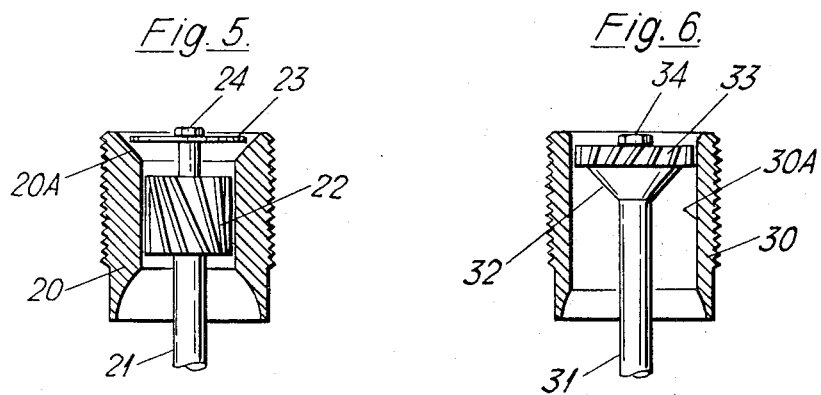
FIG. 5 illustrates a first variation of a rotor and associated seats.
FIG. 6 illustrates a second variant of a turbine and associated seats.

By making the bearing heads 17 and turbine 16 easily removable from spindle 15, it becomes possible to quickly dismantle the flowmeter and to change the mode of operation, for example, referring to FIG. 5, a bearing head 17 may be replaced by a disc 23 (fastened to the spindle 21 by a nut 24) stator passage 20 and integral frusto-conical seat 20A may replace 12 and 13A, being of such dimensions as to suit a changed turbine 22 and the new head 23. Such changes may be made in order to extend the range of the flowmeter, or to provide satisfactory flow measurement for liquids having different viscosities.

Yet a further variation is illustrated in FIG. 6, in which the stator passage, now 30, is provided with a smooth, parallel bore 30A co-axial therewith, and turbine 33 has a frusto-conical member 32 upstream thereof, both turbine 33 and member 32 being fastened to the spindle 32 by a nut 34. This particular arrangement is of interest in that a bearing head and seat are not provided, the divided flow streams so acting upon each turbine 33 and member 32 that the rotor comprising these components is moved to adopt a co-axial position in the tube 11, the turbines 33 each being approximately equidistant from the axis of the inlet duct 4. In order to enhance the self-centering effect, the bore 30A of stator passages A may be slightly tapered, but such provision is not a necessity for reasons as yet unknown.

Rotation of the flowmeter rotor is detected by a magnetic sensor 18, such as in this example an inductance, which extends through the side of body 1, through guide means 10, tube 11 and flow-dividing element 12, each of which are suitably drilled, so that the inductance is adjacent but slightly spaced from the spindle 15 (or 21 or 31) in which is eccentrically embedded a piece of ferrite (not shown) or other suitably magnetic material. As the spindle 15 rotates, the ferrite modifies the inductance of the sensor each time the ferrite passes thereby. The cyclic change of inductance can be detected by means of an oscillator the frequency of which can be made to vary as the inductance varies, and the frequency changes converted by suitable circuitry into a series of pulses, the rate of which is the speed of rotor rotation. The pulses can then be used to operate a counter to give an indication of total flow againts time, or the pulses can be integrated to give instantaneous flow rates.

The example of flowmeter described, and including the variations in stator passages and associated turbines etc., provides stable rotation of the rotor, but will only operate in one sense of direction of fluid flow. Should there be a reversal of flow, the fluid can pass (because one head is always unseated) but will not be metered because the other head will be engaged by solid friction with its seat.

The turbine rotors may have axial (rather than helical) vanes. Moreover, the turbine rotors themselves instead of being profiled as cylinders of rotation, may be of frusto-conical profile or frustospherical profile, their associated stator passages of course being correspondingly shaped. In the case of a flowmeter required to pass high rates of flow, straightening cascades or similar stator blade arrangements may be provided where so desired, in order to avoid pressure loss or unnecessary turbulence.

We claim:

1. A fluid flowmeter comprising:
   a housing having a common inlet duct and a common outlet duct, said ducts carrying the entire fluid to be measured;
   two stator passages in said housing co-axially aligned and extending oppositely from said inlet duct;
   a seat borne by and co-axial with each stator passage;
   two further passages each leading from a respective stator passage to communicate with said outlet duct;
   a rotor driven to rotate by fluid flow and disposed in said stator passages;
   a sensor of rotor rotation; said rotor including
   a bearing head mounted on each end of the rotor for rotative co-operation with a respective seat,
   a fluid drive turbine co-axial and rigid with each head, and
   a spindle co-axial and rigid with and extending between said turbines and said heads for rotation therewith, said turbines being driven to rotate said spindle in the same direction, and the clearance between said heads in relation to said seats allowing either both said heads to be unseated or one said head to be seated whilst the other is unseated.

2. A flowmeter according to claim 1 in which said bearing heads are frusto-conical.

3. A flowmeter according to claim 1 in which said seats are frusto-conical.

4. A flowmeter according to claim 1 in which each of said heads is a disc and said seats are frusto-conical.

5. A flowmeter according to claim 2 in which said bearing heads are demountably secured to said spindle, and said seats are demountably secured to said stator passages.

6. A flowmeter according to claim 1 further including a flow-divider situated between said stator passages so as to divide and direct the fluid flow respectively thereinto, said flow-divider having a bore through which said spindle freely and rotatably extends.

7. A fluid flowmeter having;
   a housing;
   a bore extending through said housing;
   an inlet duct leading into said bore;
   an outlet duct leading from said bore and co-axial with said inlet duct;
   said ducts carrying the entire fluid to be measured and the axis of said ducts being at 90° to that of said bore;

a fluid guide having an inlet passage in the wall thereof arranged within and dividing said bore into two sections said guide including a cylindrical passage extending through said guide means in the same axial direction as said bore, said inlet passage leading into said cylindrical passage;
   a cylindrical tube, having an inlet port in the wall thereof, arranged within and extending through the cylindrical passage of said guide means so that its inlet port fluidly communicates with said inlet duct via said inlet passage;
   a stator element defining a stator passage, arranged within and co-axial with each end of said tube which is adapted to receive said elements;
   a flow-dividing element situated within said tube in the vicinity of said inlet port and shaped so as to divide the fluid flow entering said tube from said inlet duct and to guide the divided flows separately through said tube towards each end thereof, the flow-dividing element having a hole extending therethrough co-axial with said tube;
   a rotor driven to rotate by fluid flow;
   a magnetic sensor of rotor rotation;
   a closure for each end of said bore situated so as to permit the divided flows to pass freely from said tube ends and into said respective bore sections; said rotor including a first turbine freely rotatable within a first stator passage, a second turbine freely rotatable within a second stator passage, a spindle rigid and co-axial with and extending between said turbines, freely and rotatably extending through said hole in said flow-dividing element, said turbines being driven by said divided flows and arranged so as to drive said spindle in the same direction, said guide means being shaped so as to guide each divided flow entering each bore section towards and into said outlet duct wherein said divided flows unite.

8. A flowmeter according to claim 7 in which a portion of each said stator element comprises a seat, and in which said rotor further includes two bearing heads each for cooperation with a respective said seat so that a. when there is any measurable flow, said rotor is so supported by the fluid passing between each said head and its respective said seat as to have no mechanical contact with any static port,
   b. when one said bearing head is seated, the other is unseated, and
   c. when the rotor is supported by fluid flow, both said heads are unseated.

9. A flowmeter according to claim 8 in which said bearing heads are frusto-conical.

10. A flowmeter according to claim 8 in which said seats are frusto-conical.

11. A flowmeter according to claim 8 in which each said bearing head is a disc and each said seat is frusto-conical.

12. A flowmeter according to claim 1 in which said bearing heads and respective said seats are so arranged that when there is any measurable flow rate said rotor is so supported by the fluid as to have no mechanical contact with any static port.

* * * * *